United States Patent
Kim

(10) Patent No.: US 9,712,092 B2
(45) Date of Patent: Jul. 18, 2017

(54) MOTOR CONTROL APPARATUS AND OPERATION METHOD FOR THE SAME

(71) Applicant: HYUNDAI MOBIS Co., Ltd., Yongin-si (KR)

(72) Inventor: Do Kun Kim, Yongin-si (KR)

(73) Assignee: HYUNDAI MOBIS CO., LTD., Yongin-Si (KR)

( * ) Notice: Subject to any disclaimer, the term of this patent is extended or adjusted under 35 U.S.C. 154(b) by 0 days.

(21) Appl. No.: 14/958,379

(22) Filed: Dec. 3, 2015

(65) Prior Publication Data

US 2016/0164438 A1  Jun. 9, 2016

(30) Foreign Application Priority Data

Dec. 4, 2014 (KR) .................. 10-2014-0172984

(51) Int. Cl.
    *H02P 6/04*    (2016.01)
    *H02P 6/22*    (2006.01)
    *H02P 6/20*    (2016.01)

(52) U.S. Cl.
    CPC . *H02P 6/22* (2013.01); *H02P 6/20* (2013.01)

(58) Field of Classification Search
    CPC ... B60T 8/4266; F16H 2063/3033; G05P 3/12
    See application file for complete search history.

(56) References Cited

U.S. PATENT DOCUMENTS 9,409,555 B2 * 8/2016 Yamamoto ................ B60T 7/12

FOREIGN PATENT DOCUMENTS

JP        09294481 A  * 11/1997

* cited by examiner

*Primary Examiner* — Karen Masih
(74) *Attorney, Agent, or Firm* — Mayer Brown LLP; Hyunho Park

(57) ABSTRACT

Provided are a motor control apparatus controlling a motor including a stator and progressing or retreating a screw so that pressure is formed in a piston provided in a brake for braking a vehicle, and an operation method thereof and the motor control apparatus includes: the motor including a rotor with a permanent magnet and a coil forming an electromagnetic field; an encoder outputting an encoder pulse and a reference pulse to correspond to rotation of the motor; and an electronic control unit controlling the motor based on the encoder pulse and the reference pulse of the encoder, wherein the location of the rotor is determined based on the encoder pulse and the reference pulse input from the encoder when the motor rotates by forcibly rotating the motor to control the motor when the motor starts, thereby starting the motor when the hall sensor is abnormal or even though the hall sensor is not provided by controlling the motor.

14 Claims, 4 Drawing Sheets

MOTOR CONTROL APPARATUS AND OPERATION METHOD FOR THE SAME

CROSS-REFERENCE TO RELATED APPLICATIONS

The present application claims priority to Korean Patent Application Number 10-2014-0172984 filed Dec. 4, 2014, the entire contents of which application is incorporated herein for all purposes by this reference.

TECHNICAL FIELD

The present invention relates to a motor control apparatus and an operation method for the same, and more particularly, to an operation method of a motor control apparatus which easily determines the location of a rotor of a motor when the motor initially starts.

BACKGROUND

A brake system of a vehicle is a system for maintaining a parking state while decelerating or stopping a driving vehicle.

The brake system generally converts kinetic energy into thermal energy by using friction force to discharge the thermal energy into the atmosphere and generate brake force. While a brake disk that rotates together with a wheel is pressed by brake pads at both sides of the brake disk by using hydraulic pressure, the vehicle is braked.

However, as the existing hydraulic brake system is implemented in such a manner to strongly push the brake pad toward the brake disk by using the hydraulic pressure while braking, the existing hydraulic brake system cannot but have a complicated configuration by a master cylinder which is actuated through a booster that boosts pedal operation force to generate the hydraulic pressure and a hydraulic line connected to a wheel cylinder, and various devices that control and assist the master cylinder and the hydraulic line and there is weakness that improvement of reliability and stability is limited due to the configuration complexity and braking performance depending on the use of the hydraulic pressure.

As a result, simplicity of the configuration which the hydraulic brake system cannot have is implemented in the vehicle and an electro-mechanical brake (EMB) which can strengthen the reliability of the braking performance is used.

In the electro-mechanical brake (EMB), when a brake pedal is pressed for the purpose of braking the vehicle, a 3-phase winding permanent magnet type synchronous electric motor, for example, a BLDC motor which is a 3-phase motor is actuated, and as a result, a pistol installed in the master cylinder moves to generate hydraulic pressure required for braking, thereby actuating a brake.

Meanwhile, in order to control the 3-phase motor, the location of a rotor included in the motor becomes an important control factor and a hall sensor and an encoder are used for detecting the location of the rotor.

However, in an electronic brake system using the 3-phase motor, there is a problem in that an initial angle of the encoder cannot be known when the motor initially starts. As a result, the electronic brake system operates by acquiring the initial angle by using the provided hall sensor and when the hall sensor is not provided or when the hall sensor is abnormal, the initial angle cannot be known, there is a problem in that starting the motor is impossible.

Therefore, while controlling the 3-phase motor in the electronic brake system, the hall sensor is fixed or even when there is no hall sensor, a research into sensing the location of the rotor of the motor by using the encoder is in progress.

SUMMARY

The present invention has been made in an effort to provide a motor control apparatus and a controlling method for the same which control a motor by determining a location of a rotor of the motor regardless of the presence or failure of a hall sensor when the motor initially starts.

An exemplary embodiment of the present invention provides a motor control apparatus including: a motor including a rotor with a permanent magnet and a stator with a coil forming an electromagnetic field and progressing or retreating a screw so as to generate pressure in a piston provided in a brake for braking a vehicle; an encoder outputting an encoder pulse and a reference pulse to correspond to rotation of the motor; and an electronic control unit controlling the motor based on the encoder pulse and the reference pulse of the encoder, wherein, the electronic control unit determines the location of the rotor based on the encoder pulse and the reference pulse input from the encoder when the motor rotates by forcibly rotating the motor so as to rotate the motor in a first rotation direction or a second rotation direction to control the motor when the motor starts.

Another exemplary embodiment of the present invention provides an operation method of a motor control apparatus controlling a motor including a rotor with a permanent magnet and a stator with a coil forming an electromagnetic field and progressing or retreating a screw so as to generate pressure in a piston provided in a brake for braking a vehicle, including: forcibly rotating the motor in a first rotation direction so that the screw progresses; determining whether a reference pulse output from an encoder is input when the motor rotates one time; forcibly rotating the motor in a second rotation direction which is an inverse direction of the first rotation direction so that the screws retreat when the reference pulse is input; and controlling the motor by determining the location of the rotor of the motor to correspond to the encoder pulse and the reference pulse input from the encoder at the time of forcibly rotating the motor in the first rotation direction and the second rotation direction.

According to exemplary embodiments of the present invention, a motor control apparatus and a controlling method for the same sense a location of a rotor of a motor by using an encoder when a motor is driven to easily drive the motor by using an encoder even when a hall sensor provided in the motor is abnormal or a hall sensor is not provided.

DETAILED DESCRIPTION

Figure 1:
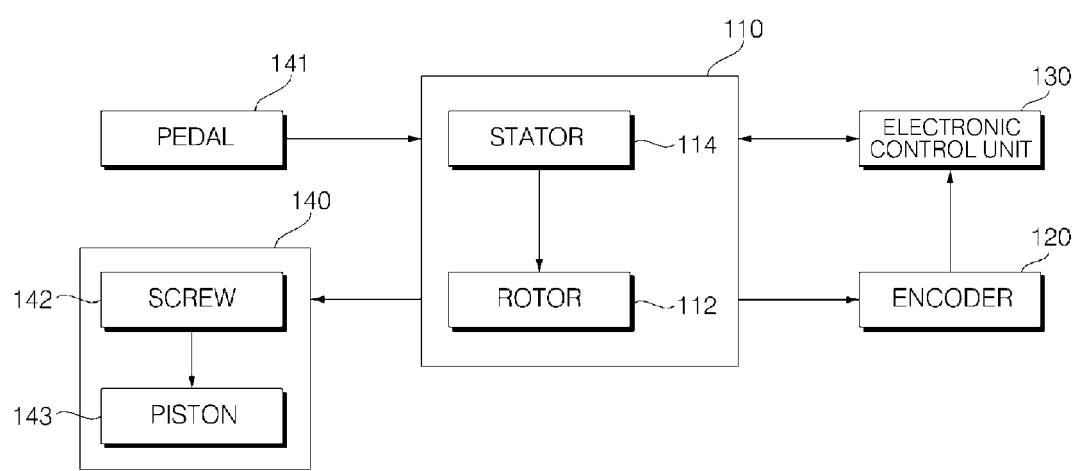
FIG. 1 is a control block diagram illustrating a control configuration of a motor control apparatus according to a first exemplary embodiment of the present invention.

The advantages and features of the present invention, and methods of accomplishing these will become obvious with reference to examples to be described below in detail along with the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Unless otherwise defined, all terms (including technical and scientific terms) used in the present specification may be used as the same meaning which may be commonly understood by the person with ordinary skill in the art, to which the present invention belongs. It will be further understood that terms defined in commonly used dictionaries should not be interpreted in an idealized or excessive sense unless expressly and specifically defined.

Hereinafter, exemplary embodiment will be described in more detail with reference to the drawings.

FIG. 1 is a control block diagram illustrating a control configuration of a motor control apparatus according to a first exemplary embodiment of the present invention.

In a vehicle, an electro-mechanical brake (EMB) controlling the vehicle to be decelerated or stopped while braking is provided. A motor control apparatus is provided in the EMB, which controls a motor 110 that allows a brake 140 to be actuated to correspond to an operation of a pedal 141.

The motor control apparatus includes the motor 110, an encoder 120, and an electronic control unit 130 as illustrated in FIG. 1. The motor 110 operates to correspond to the operation of the pedal 141 according to the control of the electronic control unit 130 and a screw 142 of the brake 140 rotatably moves to allow pressure to be generated in a piston 143, thereby actuating the brake 140.

The motor 110 may rotate in a first rotation direction or the first rotation direction and a second rotation direction which is an inverse direction of the first rotation direction by the control of the electronic control unit 130.

In this case, the motor 110 includes a rotor 112 with a permanent magnet and a stator 114 with a 3-phase coil generating an electromagnetic field in order to rotatably drive the rotor 112.

Herein, the permanent magnet of the rotor 112 has 16 polarities and generates electrical rpm according to the number of polarities. In this case, the permanent magnet is constituted by 8 both plus and minus polarities to have 16 polarities.

The encoder 120 may output an encoder pulse of 4069 pulses and output a reference pulse once when the rotor 112 rotates at one time. In this case, one-time rotation of the rotor is mechanically one-time rotation (360°).

The encoder 120 may generate 8 rotation outputs at an electrical angle when the rotor 112 rotates one time due to the number of polarities of the rotor 112. The electrical one-time rotation corresponds to 512 pulses and 4096 pulses correspond to 8 rotations.

The electronic control unit 130 may progress the screw 142 that interworks with the motor 110 by forcibly rotating the motor 110 in the first rotation direction in order to sense the location of the rotor 112 of the motor 110 for initial starting when the motor 110 stops. Meanwhile, a piston 143 installed in a master cylinder progresses or retreats by progress or retreat of the screw 116 to move a brake pad (not illustrated), and as a result, braking is achieved.

In this case, the electronic control unit 130 may rotate the rotor 112 of the motor 110 at one-time rotation or more so as to output the reference pulse from the encoder 120.

The electronic control unit 130 designates an input point of the reference pulse as an index point of the motor 110 when the reference pulse is input from the encoder 120 when the motor rotates.

The electronic control unit 130 counts the encoder pulse and the reference pulse output from the encoder 120 by forcibly rotating the rotor 112 of the motor 110 in the second rotation direction after the index point of the motor 110 is designated.

When a current value for 3-phase power applied to the motor 110 rises, the electronic control unit 130 determines that the rotator 112 of the motor 110 stops and designates count values of the encoder pulse and the reference pulse as an end point of the piston 143.

Thereafter, the electronic control unit 130 resets a movement distance of the screw 142 to a zero point based on the count values of the encoder pulse and the reference pulse.

The electronic control unit 130 rotates the rotor 112 of the motor 110 in the first rotation direction to designate a trigger point at which pressure is generated by the screw 142.

Thereafter, the electronic control unit 130 designates an intermediate point between the trigger point and the index point as an initial point for normally controlling the motor 110 to control the motor 110.

Herein, in the case of the trigger point, when the screw 142 progresses, pressure is generated at a via hole point formed in the piston 143 and in this case, the via hole point may be designated as the trigger point.

Thereafter, when the rotor 112 of the motor 110 is positioned at the initial point, the electronic control unit 130 resets the encoder 120 and normally controls the motor 110 to start the motor 110.

Figure 2:
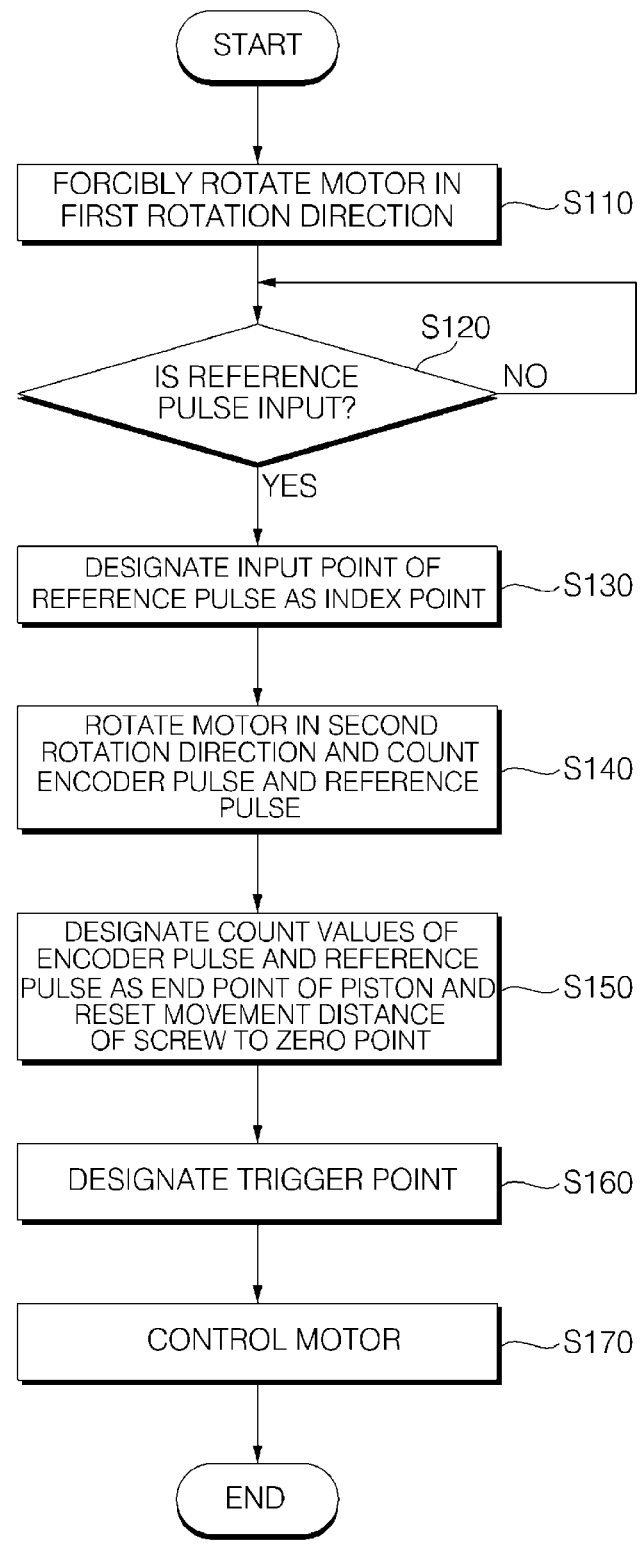
FIG. 2 is a flowchart illustrating an operation method of the motor control apparatus according to the first exemplary embodiment of the present invention.

FIG. 2 is a flowchart illustrating an operation method of the motor control apparatus according to the first exemplary embodiment of the present invention.

Referring to FIG. 2, the electronic control unit 130 of the motor control apparatus forcibly rotates the motor 110 in the first rotation direction so that the screw 142 progresses (S110) and determines whether the reference pulse output from the encoder 120 is input when the motor rotates one time (S120).

When the reference pulse is input, the electronic control unit 130 designates the input point of the reference pulse as the index point of the motor 110 (S130) and rotates the motor 110 in the second rotation direction different from the first rotation direction so that the screw 142 retreats to count the encoder pulse and the reference pulse output from the encoder 120 (S140).

In this case, the electronic control unit 130 controls the motor 110 so that the screw 142 retreats up to a stopper location of the screw 142. When the screw 142 is positioned at the stopper, the motor does not rotate any longer in a stop state and the current value rises.

The electronic control unit 130 designates the count values of the encoder pulse and the reference pulse as the end point of the piston 143 and resets the movement distance of the screw 142 to the zero point (S150).

Further, the electronic control unit 130 rotates the motor 110 in the first rotation direction to designate the trigger point at which the pressure is generated by the screw 142 (S160) and designates the intermediate point between the trigger point and the index point as the initial point for normally controlling the motor 110 to control the motor 110 (S170).

Figure 3:
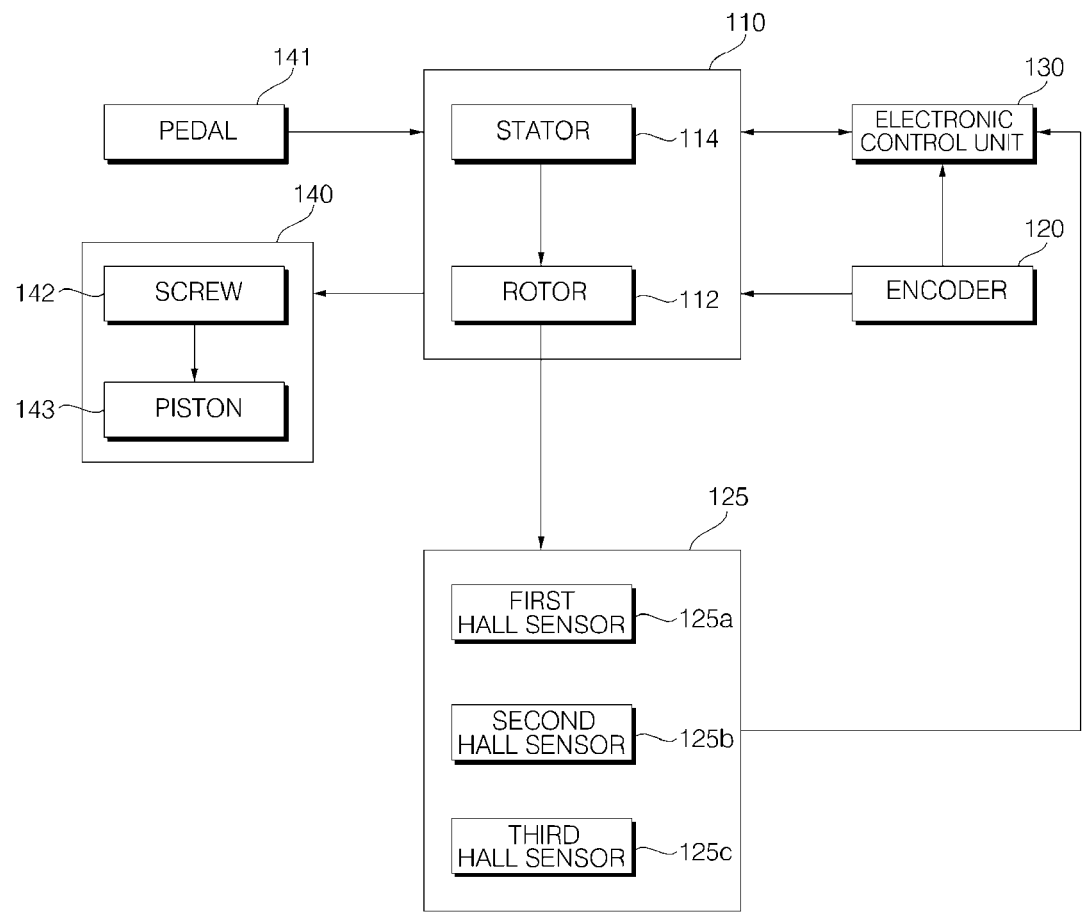
FIG. 3 is a control block diagram illustrating a control configuration of a motor control apparatus according to a second exemplary embodiment of the present invention.

FIG. 3 is a control block diagram illustrating a control configuration of a motor control apparatus according to a second exemplary embodiment of the present invention.

Referring to FIG. 3, the motor control apparatus may include the motor 110, the encoder 120, a hall sensor 125, and an electronic control unit 130.

The motor 110 operates to correspond to the operation of the pedal 141 according to the control of the electronic control unit 130 and the screw 142 of the brake 140 rotatably moves to allow the pressure to be generated in the piston 143, thereby actuating the brake 140.

The motor 110 may rotate in the first rotation direction or the second rotation direction which is the inverse direction of the first rotation direction by control of the electronic control unit 130.

In this case, the motor 110 includes the rotor 112 with the permanent magnet and the stator 114 with the 3-phase coil generating the electromagnetic field in order to rotatably drive the rotor 112. Herein, the permanent magnet of the rotor 112 has 16 polarities and generates electrical rpm according to the number of polarities. In this case, the permanent magnet is constituted by 8 both plus and minus polarities to have 16 polarities.

The encoder 120 may output an encoder pulse of 4069 pulses and output the reference pulse one time when the rotor rotates one time. In this case, one-time rotation of the rotor is one mechanical rotation (360°).

The encoder 120 may generate 8 rotation outputs at the electrical angle when the rotor 112 rotates one time due to the number of polarities of the rotor 112. The electrical one-time rotation corresponds to 512 pulses and 4096 pulses correspond to 8 rotations.

Three hall sensors, that is, a first hall sensor 125a, a second hall sensor 125b, and a third hall sensor 125c are connected to three phases of the motor 110, that is, a U-phase, a V-phase, and a W-phase, respectively, to generate output signals, respectively by a phase difference of 120° according to a change of magnetism. In detail, when an N pole of the permanent magnet passes through each hall sensor, a High signal may be output and when an S pole of the permanent magnet passes through the hall sensor 125, a Low signal may be output. In this case, the hall sensor may output a signal even when the motor stops.

When the plurality of hall sensors 125a, 125b, and 125c are normal, the motor 110 initially operates and thereafter, the electronic control unit 130 may reset the encoder 120 with respect to an output signal of any one phase among 3-phase power sources of the motor, to which the first to third hall sensors 125a, 125b, and 125c are connected.

The electronic control unit 130 may combine all of 6 hall sensor states 41 to 46 by combining the output signals of 3 hall sensors 125a, 125b, and 125c and each state may determine the location of the rotor 10 through the output signal of the hall sensor 125.

A first state is a state in which the first hall sensor 125a outputs the High signal, the second hall sensor 125b outputs the Low signal, and the third hall sensor 125c outputs the High signal and is '101' as a binary number and the first state is expressed by a decimal number to be represented by 'state 5'.

A second state is a state in which the first hall sensor 125a outputs the High signal, the second hall sensor 125b outputs the Low signal, and the third hall sensor 125c outputs the Low signal and is '100' as the binary number and the second state is expressed by the decimal number to be represented by 'state 4'.

A third state is a state in which the first hall sensor 125a outputs the High signal, the second hall sensor 125b outputs the High signal, and the third hall sensor 125c outputs the Low signal and is '110' as the binary number and the third state is expressed by the decimal number to be represented by 'state 6'.

A fourth state is a state in which the first hall sensor 125a outputs the Low signal, the second hall sensor 125b outputs the High signal, and the third hall sensor 125c outputs the Low signal and is '010' as the binary number and the fourth state is expressed by the decimal number to be represented by 'state 2'.

A fifth state is a state in which the first hall sensor 125a outputs the Low signal, the second hall sensor 125b outputs the High signal, and the third hall sensor 125c outputs the High signal and is '011' as the binary number and the fifth state is expressed by the decimal number to be represented by 'state 3'.

A sixth state is a state in which the first hall sensor 125a outputs the Low signal, the second hall sensor 125b outputs the Low signal, and the third hall sensor 125c outputs the High signal and is '001' as the binary number and the sixth state is expressed by the decimal number to be represented by 'state 1'.

The electronic control unit 130 resets the encoder 120 whenever '101' which is the first state is generated. In particular, the electronic control unit 130 resets the encoder counter and resets the encoder in terms of hardware.

As described above, the electronic control unit 130 may determine the location of the rotor 112 and determine a forward/reverse rotation direction of the rotor 112 and an error of the encoder 120 in each state through an output sequence of the first to sixth states to correspond to the first to sixth states by the outputs of the first to third hall sensors 125a, 125b, and 125c.

In this case, the electronic control unit 130 may progress the screw 142 that interworks with the motor 110 by forcibly rotating the motor 110 in the first rotation direction in order to start the motor 110 by sensing the location of the rotor 112 of the motor 110 when the motor 110 stops in the case where the failure occurs in the first to third hall sensors 125a, 125b, and 125c.

In this case, the electronic control unit 130 may rotate the rotor 112 of the motor 110 one-time or more so as to output the reference pulse from the encoder 120.

The electronic control unit 130 designates the input point of the reference pulse as the index point of the motor 110 when the reference pulse is input from the encoder 120.

The electronic control unit 130 counts the encoder pulse and the reference pulse output from the encoder 120 by forcibly rotating the rotor 112 of the motor 110 in the second rotation direction after the index point of the motor 110 is designated.

In this case, the electronic control unit 130 controls the motor 110 so that the screw 142 retreats up to the stopper location of the screw 142. When the screw 142 is positioned at the stopper, the motor does not rotate any longer in the stop state and the current value rises.

When the current value for the 3-phase power applied to the motor 110 rises, the electronic control unit 130 determines that the rotor 112 of the motor 110 stops and designates the count values of the encoder pulse and the reference pulse as the end point of the piston 143.

Thereafter, the electronic control unit 130 resets the movement distance of the screw 142 to the zero point based on the count values of the encoder pulse and the reference pulse.

The electronic control unit 130 rotates the rotor 112 of the motor 110 in the first rotation direction to designate the trigger point at which the pressure is generated by the screw 142.

Thereafter, the electronic control unit 130 designates the intermediate point between the trigger point and the index point as the set initial point for normally controlling the motor 110 to control the motor 110.

Herein, when the screw 142 progresses, the pressure is generated at the via hole point formed in the piston 143 and in this case, the via hole point at which the pressure is generated may be designated as the trigger point.

Thereafter, when the rotor 112 of the motor 110 is positioned at the initial point, the electronic control unit 130 resets the encoder 120 and normally controls the motor 110 to start the motor 110.

Figure 4:
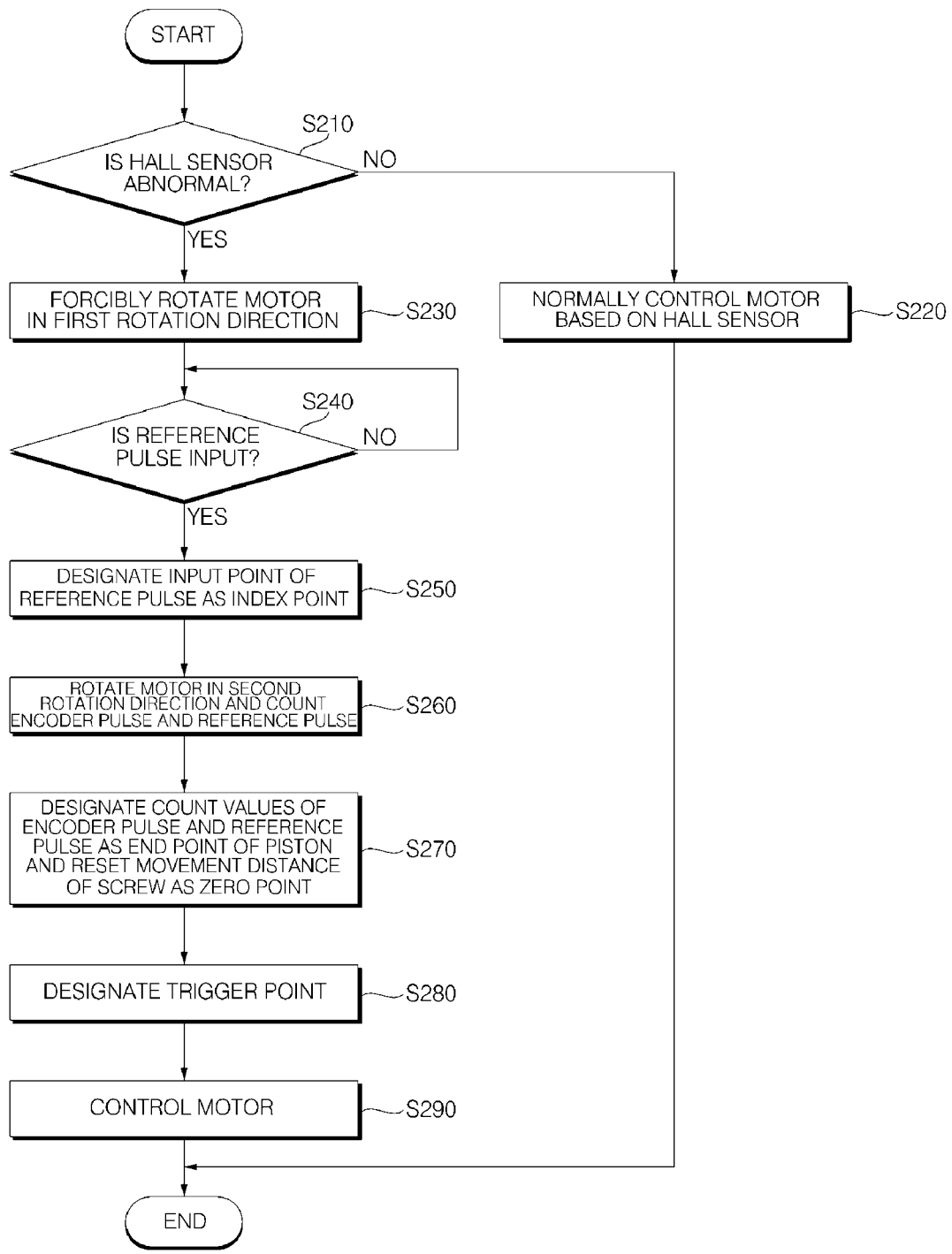
FIG. 4 is a flowchart illustrating an operation method of the motor control apparatus according to the second exemplary embodiment of the present invention.

FIG. 4 is a flowchart illustrating an operation method of the motor control apparatus according to the second exemplary embodiment of the present invention.

Referring to FIG. 4, the electronic control unit 130 of the motor control apparatus determines whether the hall sensor 125 sensing the location of the motor 110 is normal or abnormal (S210) and when it is determined that the hall sensor 125 is normal, the electronic control unit 130 normally controls the motor 110 according to the output signals output from the hall sensor 125, that is, the first to third hall sensors 125a, 125b, and 125c connected to the respective phases of the motor (S220).

When it is determined that the hall sensor 125 is abnormal, the electronic control unit 130 forcibly rotates the motor 110 in the first rotation direction so that the screw 142 progresses (S320) and determines whether the reference pulse output from the encoder 120 is input when the motor 110 rotates one time (S240).

When the reference pulse is input, the electronic control unit 130 designates the input point of the reference pulse as the index point of the motor 110 (S250) and rotates the motor 110 in the second rotation direction to count the encoder pulse and the reference pulse output from the encoder 120 (S260).

In this case, the electronic control unit 130 controls the motor 110 so that the screw 142 retreats up to the stopper location of the screw 142. When the screw 142 is positioned at the stopper, the motor does not rotate any longer in the stop state and the current value rises.

The electronic control unit 130 designates the count values of the encoder pulse and the reference pulse as the end point of the piston 143 and resets the movement distance of the screw 142 to the zero point (S270).

Further, the electronic control unit 130 rotates the motor 110 in the first rotation direction to designate a point at which the pressure is generated by the screw 142 as the trigger point (S280) and designates the intermediate point between the trigger point and the index point as the initial point for normally controlling the motor 110 to control the motor 110 (S290).

Unless explicitly described to the contrary, since the word "include", "constitute" or "have" implies the inclusion of stated elements, it may be analyzed that the word "include", "constitute" or "have" means not the exclusion of any other elements but further inclusion of any other elements.

Preferred exemplary embodiments of the present invention have been illustrated and described above, but the present invention is not limited to the above-described specific embodiment, it is obvious d that various modification may be made by those skilled in the art, to which the present invention pertains without departing from the gist of the present invention, which is claimed in the claims, and such modified embodiments should not be individually understood from the technical spirit or prospect of the present invention.

What is claimed is:

1. A motor control apparatus comprising:
   a motor including a rotor with a permanent magnet and a stator with a coil forming an electromagnetic field and progressing or retreating a screw so as to generate pressure in a piston provided in a brake for braking a vehicle;
   an encoder outputting an encoder pulse and a reference pulse to correspond to rotation of the motor;
   an electronic control unit controlling the motor based on the encoder pulse and the reference pulse of the encoder,
   wherein, the electronic control unit determines the location of the rotor based on the encoder pulse and the reference pulse input from the encoder when the motor rotates by forcibly rotating the motor so as to rotate the motor in a first rotation direction or a second rotation direction to control the motor when the motor starts; and
   a hall sensor sensing the location of the rotor,
   wherein the electronic control unit determines whether the hall sensor is normal or abnormal and when the hall sensor is normal, controls the motor to correspond to an output signal for each phase of the motor, which is output from the hall sensor.

2. The motor control apparatus of claim 1, wherein:
   the motor rotates in the first rotation direction so that the screws progresses and rotates in the second rotation direction so that the screw retreats, and
   the encoder outputs the encoder pulse corresponding to the number of polarities of the permanent magnet included in the rotor and the reference pulse when the rotor rotates one time.

3. The motor control apparatus of claim 1, wherein the electronic control unit determines whether the reference pulse is input by forcibly rotating the rotor in the first rotation direction in order to calculate the location of the rotor when the motor starts and designates an input point of the reference pulse as an index point when the reference pulse is input.

4. The motor control apparatus of claim 1, wherein the electronic control unit counts the encoder pulse and the reference pulse by forcibly rotating the rotor in the second rotation direction and when current supplied to the coil rises, designates count values of the encoder pulse and the reference pulse as an endpoint of the piston that interworks with the screw.

5. The motor control apparatus of claim 4, wherein the electronic control unit designates the end point of the piston and thereafter, resets a movement distance of the screw to a zero point based on the count values of the encoder pulse and the reference pulse, and designates a point at which pressure is generated in the screw as a trigger point by rotating the rotor in the first rotation direction.

6. The motor control apparatus of claim 5, wherein the electronic control unit designates an intermediate point between the index point and the trigger point as an initial point for normally controlling the motor to control the motor.

7. The motor control apparatus of claim 1, wherein the electronic control unit determines the location of the rotor based on the encoder pulse and the reference pulse input from the encoder by forcibly rotating the motor in the first rotation direction or the second rotation direction and thereafter, controls the motor when the hall sensor is abnormal.

8. An operation method of a motor control apparatus controlling a motor including a rotor with a permanent magnet and a stator with a coil forming an electromagnetic field and progressing or retreating a screw so as to generate pressure in a piston provided in a brake for braking a vehicle the operation method comprising:

determining whether a hall sensor sensing the location of the motor is normal or abnormal before forcibly rotating the motor in the first direction;

forcibly rotating the motor in a first rotation direction so that the screw progresses;

determining whether a reference pulse output from an encoder is input when the motor rotates one time;

forcibly rotating the motor in a second rotation direction which is an inverse direction of the first rotation direction so that the screws retreat when the reference pulse is input; and controlling the motor by determining the location of the rotor of the motor to correspond to the encoder pulse and the reference pulse input from the encoder at the time of forcibly rotating the motor in the first rotation direction and the second rotation direction.

9. The operation method of claim 8, further comprising:
controlling the motor according to an output signal for each phase of the motor, which is output from the hall sensor when it is determined that the hall sensor is normal.

10. The operation method of claim 8, wherein when the hall sensor is abnormal or when the hall sensor is not provided, the motor is forcibly rotated in the first rotation direction.

11. The operation method of claim 8, further comprising:
when the motor is forcibly rotated in the second rotation direction, designating an input point of the reference pulse as an index point of the motor when the reference pulse is input; and counting an encoder pulse and a reference pulse output from the encoder by rotating the motor in the second rotation direction.

12. The operation method of claim 11, further comprising:
designating count values of the encoder pulse and the reference pulse as an end point of a piston and resetting a movement distance of the screw to a zero point;

designating a point at which pressure is generated by the screw as a trigger point by rotating the motor in the first rotation direction; and controlling the motor by designating an intermediate point between the trigger point and the index point as a set initial point for normally controlling the motor.

13. The operation method of claim 12, wherein when the movement distance of the screw is reset to the zero point, the movement distance of the screw is calculated based on the count values of the encoder pulse and the reference pulse.

14. The operation method of claim 12, wherein when the trigger point is designated, in the case where pressure is generated at a via hole point formed in the piston when the screw progresses, the via hole point at which the pressure is generated is designated as the trigger point.

* * * * *